Patented Nov. 24, 1925.

1,562,468

UNITED STATES PATENT OFFICE.

HEINRICH NERESHEIMER, OF LUDWIGSHAFEN-ON-THE-RHINE, GERMANY, ASSIGNOR TO BADISCHE ANILIN- & SODA-FABRIK, OF LUDWIGSHAFEN-ON-THE-RHINE, GERMANY, A CORPORATION OF GERMANY.

MANUFACTURE OF VAT DYESTUFFS.

No Drawing. Application filed November 11, 1924. Serial No. 749,320.

*To all whom it may concern:*

Be it known that I, HEINRICH NERESHEIMER, citizen of the Kingdom of the Netherlands, residing at Ludwigshafen-on-the-Rhine, Germany, have invented new and useful Improvements in the Manufacture of Vat Dyestuffs, of which the following is a specification.

It has been shown in the specification of U. S. Patent 837,775 that dibenzanthrone can be converted into a chlorinated derivative by treating it with a current of chlorine gas in nitrobenzene suspension which chloroderivative, however, in spite of its very valuable, very bluish shade could not find commercial use in view of its insufficient fastness to light, compared with other vat coloring matters.

I have found that a chlorinated dibenzanthrone of substantially the same valuable violet-blue shade and other properties, but with an excellent fastness to light can be obtained by chlorinating dibenzanthrone with the aid of a chlorid (metallic or metalloid) capable of being converted into a chlorid of a lower valence in the course of the reaction. Organic diluents are preferably used, and chlorinated benzenes have proved particularly useful as such.

The same new coloring matter can also be obtained by chlorinating dibenzanthrone with free chlorine under certain conditions for example by working in trichlorobenzene and at a temperature of between 40 degrees and 50 degrees centigrade until the desired shade is obtained. The amount of chlorine contained in the new dyestuff may vary within very wide limits.

The following examples will serve to further illustrate the invention and some manners of producing the new product, but the invention is not confined to these specific examples. The parts are by weight.

Example 1.

10 parts of pure dibenzanthrone are heated to about 150 degrees centigrade together with 100 parts of trichlorobenzene and 30 parts of antimony pentachlorid until a filtered test portion of the precipitate dissolves in alkaline hydrosulfite solution clear greenish blue. The mixture is then allowed to cool to about 80 degrees centigrade, the dyestuff filtered off and freed from organic diluent in the usual way.

The coloring matter so obtained is a dark violet powder, insoluble in alcohol, difficultly soluble in acetone, benzene and the like and more easily soluble in high boiling solvents such as nitrobenzene and trichlorobenzene with a red violet color and a bright red fluorescence. Its solution in concentrated sulfuric acid is red violet. It dies cotton from a greenish blue vat violet blue shades of excellent fastness.

Example 2.

Introduce into a mixture of 10 parts of pure dibenzanthrone and 80 parts of trichlorobenzene, 30 parts of anhydrous ferric chlorid, while stirring and at a temperature of between 120 degrees and 140 degrees centigrade. Stirring is continued for two or three hours at the same temperatures and subsequently at about 160 degrees centigrade for the same length of time. The mixture is then cooled to about 100 degrees centigrade, the dyestuff which has been separated, filtered off and freed from adherent solvent and salts by treatment with steam while adding a little hydrochloric acid. The dyestuff resembles in its properties that obtained in accordance with Example 1.

Now what I claim is:

1. The process of manufacturing a chlorinated dibenzanthrone vat dyestuff which consists in acting on dibenzanthrone with a chlorid capable of being converted, in the course of the reaction, into a chlorid of a lower valence.

2. The process of manufacturing a chlorinated dibenzanthrone vat dyestuff which consists in acting on dibenzanthrone in the presence of a chlorinated benzene with a chlorid capable of being converted, in the course of the reaction, into a chlorid of a lower valence.

3. As a new article of manufacture, a chlorinated vat dyestuff of the dibenzanthrone series as it can be obtained by acting on dibenzanthrone with a chlorid capable of being converted, in the course of the reaction, into a chlorid of a lower valence, which is characterized by producing violet shades of a strong bluish cast and an excellent fastness to light, considerably superior to that of a similar product obtained by treating dibenzanthrone with chlorine gas in nitrobenzene suspension and giving a greenish blue vat and dissolving in concentrated sulfuric acid with a red violet coloration.

In testimony whereof I have hereunto set my hand.

HEINRICH NERESHEIMER.